United States Patent
Jahr

(10) Patent No.: US 8,346,224 B2
(45) Date of Patent: Jan. 1, 2013

(54) METHOD AND APPARATUS FOR CREATING A RATING SYSTEM FOR MOBILE SUBSCRIBERS BASED ON WIRELESS SUBSCRIBER SPECIFIC CREDENTIALS

(76) Inventor: Christoph Jahr, Ashburn, VA (US)

(*) Notice: Subject to any disclaimer, the term of this patent is extended or adjusted under 35 U.S.C. 154(b) by 555 days.

(21) Appl. No.: 12/403,500

(22) Filed: Mar. 13, 2009

(65) Prior Publication Data

US 2009/0233586 A1    Sep. 17, 2009

Related U.S. Application Data

(60) Provisional application No. 61/036,168, filed on Mar. 13, 2008.

(51) Int. Cl.
*H04M 3/42* (2006.01)

(52) U.S. Cl. ............. 455/414.1; 455/558; 455/432.3; 455/412.1; 455/418; 455/556.1; 455/557

(58) Field of Classification Search ............ 455/558, 455/432.3, 412.1, 418, 556.1, 557, 414.1
See application file for complete search history.

(56) References Cited

U.S. PATENT DOCUMENTS

| | | | |
|---|---|---|---|
| 2002/0156674 A1* | 10/2002 | Okamoto et al. | 705/11 |
| 2008/0008157 A1* | 1/2008 | Edge et al. | 370/351 |
| 2008/0242274 A1* | 10/2008 | Swanburg et al. | 455/414.1 |
| 2009/0027223 A1* | 1/2009 | Hill | 340/686.6 |

* cited by examiner

*Primary Examiner* — Kwasi Karikari
(74) *Attorney, Agent, or Firm* — John T. Whelan

(57) ABSTRACT

An improved system and method for rating subscribers based on wireless subscriber specific credentials. A wireless network operator, or a content/application provider assigns to a subscriber a unique username. For purposes of providing rating or feedback information, the assigned username acts uniquely to identify the subscriber, whose actual identity therefore remains anonymous. The subscriber uses his or her mobile phone to access a mobile telephony network. Evaluators may offer feedback or ratings of the subscriber using the internet.

14 Claims, 5 Drawing Sheets

METHOD AND APPARATUS FOR CREATING A RATING SYSTEM FOR MOBILE SUBSCRIBERS BASED ON WIRELESS SUBSCRIBER SPECIFIC CREDENTIALS

CROSS REFERENCE TO RELATED APPLICATION

This application claims the benefit of and priority to U.S. Provisional Patent Application No. 61/036,168, filed Mar. 13, 2008, the disclosure of which is hereby incorporated herein by reference as if set forth in its entirety.

FIELD OF THE INVENTION

The present invention relates to a method and apparatus for rating mobile subscribers based on wireless subscriber specific credentials. More specifically the present invention is directed to a system and method for enabling the rating of a subscriber by an evaluator using parameters of the subscriber's mobile telephone.

BACKGROUND OF THE INVENTION

Publicly available peer reviews have become a conduit for anonymous buyers and anonymous sellers to engage in commercial transactions over the Internet since the mass adoption of Internet-based technology. Companies such as eBay, Amazon and others have popularized such peer reviews, or "feedback systems". Such a medium allows a buyer and seller of goods and services the opportunity to build confidence in a person's level of credibility, trustworthiness and honesty.

Public ratings may be the basis upon which a consumer or business will make the decision to buy/sell products or services to/from other persons or businesses. For example, a seller using eBay that has amassed predominantly favorable ratings from its buyers is more likely to sell his products as compared with another seller with no, fewer, or lower ratings, all other things being equal.

Publicly available feedback or ratings are typically associated with a username, such as a self-originated name ("John Doe"), an email address ("john.doe@emailaddress.com"), or a computer-generated name ("JohnDoe12345"). That is, the username is permanent (or quasi-permanent) and must be provided or initiated by the user. Feedback or ratings may only be provided if one knows the username of the entity to be rated.

There exists a need, therefore, to permit an individual or organization (hereafter, an "evaluator") to rate/review a provider of products or services where the username of the provider is not known by the individual or organization. More particularly, there exists a need to permit an evaluator to rate/review of provider of products or services offered by a mobile subscriber.

As used herein, the term "mobile phone" includes cellular and/or satellite mobile telephones; Personal Communications System (PCS) terminals that may combine a mobile phone with data processing, facsimile and/or data communications capabilities; Personal Digital Assistants (PDAs) that can include a radio frequency transceiver and a pager, Internet/Intranet access, Web browser, organizer, calendar and/or a global positioning system (GPS) receiver; and/or conventional laptop and/or palmtop computers or other appliances, which include a radio frequency transceiver. As used herein, the term "mobile phone" also includes any other radiating user device/equipment/source that may have time-varying or fixed geographic coordinates, and may be portable, transportable, installed in a vehicle (aeronautical, maritime, or land-based), or situated and/or configured to operate locally and/or in a distributed fashion at any other location(s) on earth and/or in space. A "mobile phone" also may be referred to herein as a "subscriber station," "radiotelephone," "radioterminal," "terminal," "wireless terminal" or "wireless user device."

As used herein, the term "mobile telephony network" means any of a plurality of wireless telephony and/or data networks, including but not limited to those based on Global System for Mobile Communications (GSM), Universal Mobile Telecommunications System (UMTS), Code-Division Multiple Access (CDMA), Wideband CDMA (WCDMA), Integrated Digital Enhanced Network (iDEN), and/or 3GPP LTE.

As used herein, the term "electronic serial number" or "mobile equipment identity" each means an identification number that is globally unique for each CDMA mobile phone. It identifies that mobile phone to the mobile telephony network, and can be used to flag for enabling services. MEID is a replacement for ESN (electronic serial number).

As used herein, the term "International Circuit Card Identification" or "ICCID" means a 19- or 20-digit unique number that identifies an individual SIM card used in GSM/UMTS phones.

As used herein, the term "International Mobile Equipment Identity" or "IMEI" means a number unique to every GSM and UMTS mobile phone, for example, a device serial number.

As used herein, the term "International Mobile Subscriber Identity" or "IMSI" means a unique number associated with a subscriber in any GMS/UMTS network. The IMSI is stored on the (U)SIM/UICC.

As used herein, the term "Mobile Directory Number" or "MDN" means the actual phone number one would dial to reach a specific mobile phone in a CDMA network.

As used herein, the term "Mobile Identification Number" or "MIN" means a unique number assigned by the CDMA wireless service provider to each mobile phone it sells or includes in its service plans.

As used herein the term "Mobile Subscriber Integrated Services Digital Network" or "MSISDN" means the actual phone number one would dial to reach a specific mobile phone in a GSM/UMTS network.

As used herein, the term "Universal Integrated Circuit Card" means a chip card used in mobile phones in GSM and UMTS networks that contain subscription, authentication and security information. A Universal Integrated Circuit Card may also contain applications or files for offering content or services.

As used herein, the term "3GPP LTE (Long Term Evolution)" means the project within the Third Generation Partnership Project (3GPP) to improve the UMTS mobile phone standard to cope with future technology evolutions. Goals include improving spectral efficiency, lowering costs, improving services, making use of new spectrum and refarmed spectrum opportunities, and better integration with other open standards.

SUMMARY OF THE INVENTION

In view of the foregoing disadvantages inherent in the known types of on-line feedback or rating systems now present in the prior art, the present invention provides an improved method and apparatus for rating subscribers based on wireless subscriber specific credentials and overcomes the above-mentioned disadvantages and drawbacks of the prior art. As such, the general purpose of the present invention, which will be described subsequently in greater detail, is to provide a new and improved method and apparatus for rating mobile subscribers based on wireless subscriber specific credentials which has all the advantages of the prior art, as set forth above, and includes novel features.

According to one embodiment of the invention, a wireless network operator, or a content/application provider assigns to a subscriber a unique username. For purposes of providing rating or feedback information, the assigned username acts uniquely to identify the subscriber, whose actual identity therefore remains anonymous. The subscriber uses his or her mobile phone to access a mobile telephony network. Evaluators may offer feedback or ratings of the subscriber using the internet, as will be described more fully below.

According to another embodiment of the invention in which the mobile telephony network operator, or a content/application provider does not give the subscriber a unique username, the default username value will be tied to the subscriber's subscription parameters. These parameters may include, for example, the subscriber's telephone number (MSISDN or MDN), the unique wireless identity (IMSI or MIN), any file including a uniquely identifiable characteristic on a SIM/UICC and optionally the mobile device serial number (IMEI or MEID). Again, the subscriber uses his or her mobile phone to access a mobile telephony network. Evaluators may offer feedback or ratings of the subscriber using the internet, as will be described more fully below.

Other aspects and advantages of the invention are readily apparent from the following detailed description, illustrating a number of particular embodiments, including the best mode contemplated for carrying out the invention. The invention is also capable of further embodiments, and its details can be modified in various respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings, and in which like reference numerals refer to similar elements, and wherein.

DESCRIPTION OF THE PREFERRED EMBODIMENT

An improved method and apparatus for rating mobile subscribers based on wireless subscriber specific credentials is described. In the following description, for the purposes of explanation, numerous specific details are set forth in order to provide a thorough understanding of the present invention. It is apparent, however, to one skilled in the art that the present invention can be practiced without these specific details or with an equivalent arrangement.

Mobile phones are ubiquitous in today's society. Many subscribers have "dedicated" mobile phones, that is, mobile phones that they purchase, lease, or receive from their employer that they keep and use exclusively (or quasi-exclusively) for an extended period (such as several months or more). Dedicated mobile phones are often expensive to purchase and require lengthy (and expensive) service commitments from the operator of the mobile telephony network on which the mobile phone operates. Other subscribers, including those that are more transient or who choose not to bear the expense of having and using a dedicated mobile phone, yet who desire the connectivity and convenience that mobile phones provide, use "pre-paid" mobile phones. Pre-paid mobile phones are intended to be used for only a limited duration determined by the amount of air time (minutes) which is purchased pre-paid by the subscriber. When the pre-paid minutes run out, the pre-paid mobile phone is often discarded instead of "reloaded" via the pre-payment of additional air time. The rate of churn of pre-paid mobile phones is therefore significant.

According to the present invention, the ability for an evaluator to rate a subscriber is predicated on the notion that the subscriber has provided goods or services prior to such time when the rating in question is given. More specifically, there is provided a method and apparatus whereby each of a plurality of evaluators and a plurality of subscribers has the ability to access a database, such as an internet database. Subscribers access the database using their mobile phones, as described below.

Figure 1:
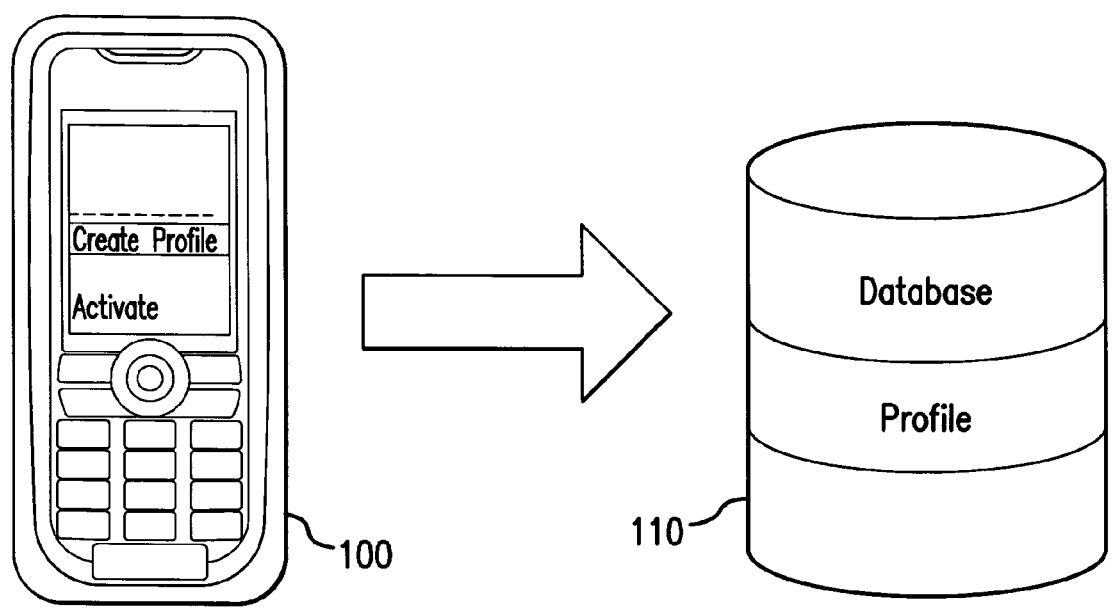
FIG. 1 is a diagram illustrating the interaction of a mobile phone 100 with a database 110 of the present invention.

As shown, for example, in FIG. 1, each subscriber has a mobile phone 100. As is known in the art, each mobile phone 100, in turn, has a subscriber identification module (SIM) (not shown). Preferably, each subscriber creates a unique profile using, for example, the mobile phone's SIM application whereby preconfigured menu items are presented to the subscriber who in turn selects from the menus and submenus until such time when all selections are completed. That is, each mobile phone 100 registers with a database 110 a unique username by which that particular mobile phone 100 (and hence the subscriber using same) is identified. In addition, according to a preferred embodiment of the invention, the MSISDN (or MDN), IMSI (or MIN), and IMEI (or MIED/ESN) of the mobile phone 100 are also transparently read into database 110. With reference to a CDMA network (or evolution thereof) the credentials will include the MIN, MDN and MEID (formerly ESN).

In this manner, a subscriber profile based on the parameters of the mobile phone 100 is created. This brings several practical advantages. For example, using wireless credentials or files on a SIM/UICC offers the mobile phone subscriber the ability to quickly and easily use his wireless device to engage in mobile commerce. In addition, the subscriber's identity is protected from the general public until he wishes to reveal said identity. Moreover, churn of pre-paid and other lower-end mobile phones will be reduced as the mobile phone's credentials become more and more inextricably associated with a given subscriber.

The subscriber profile may also include additional information related to goods and/or services which the subscriber wishes to offer to others. For example, the subscriber may select an industry in which he has work experience (e.g. construction), and the trade in which he is specialized (e.g. drywall hanging), number of years of experience in this trade, his English language proficiency, the wage he is seeking and finally the zip code in which he is seeking work. After the profile has been created and the subscriber is ready to actively seek work, he may select an "Activate" icon from a menu presented by the SIM. This selection initiates the sending of a text or other message to the database 110, thus allowing for visitors to see his availability on website or by other means. In a preferred embodiment, this text (or other) message will start a preconfigured timer, after which the time elapses the subscriber will be removed from the availability database.

Figure 2:
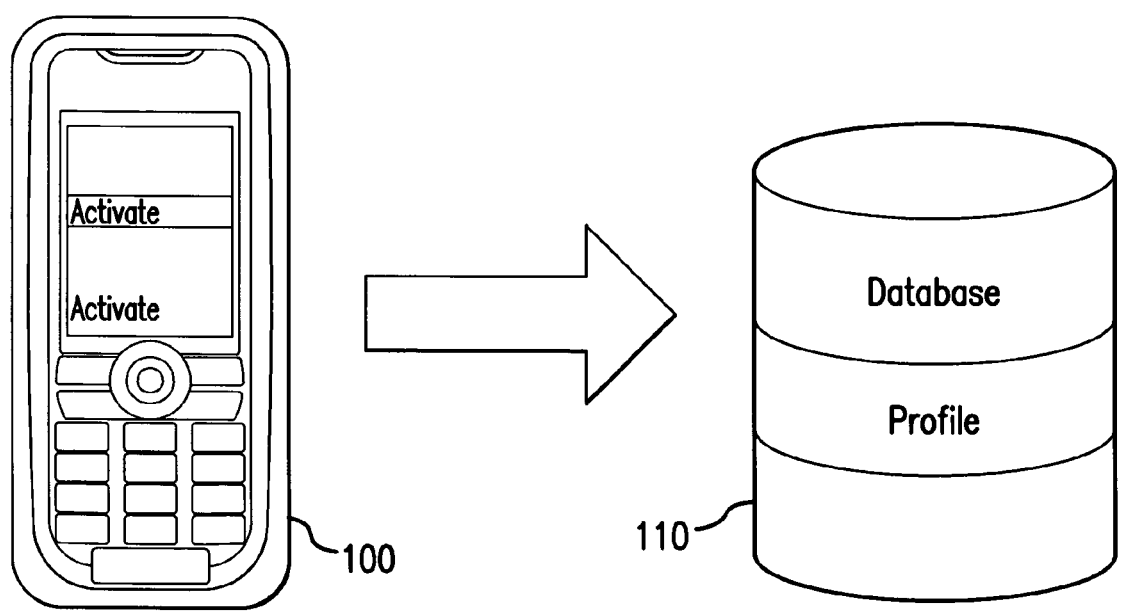
FIG. 2 is a diagram illustrating the further interaction of a mobile phone 100 with database 110 of the present invention.

More specifically, referring to FIG. 2, a subscriber makes himself available by selecting an "Activate" (or similar) menu item on his mobile phone 100. Alternatively, the subscriber may activate through a dedicated company website (after successful authentication thereto), compose and send a text message to a predetermined destination optionally containing text in the body of the text message, use an Interactive Voice Response (IVR) system called by the subscriber that relies on voice or keypad commands to communicate with the database, send an email to a specified address with a keyword in the subject line, or place a call to a customer care facility where the activation is manually entered. Upon doing so, that subscriber's profile in database 110 is modified to reflect the subscriber's availability. In a preferred embodiment of the present invention, the availability of a subscriber (as reflected in database 110) expires after a predetermined period of time, for example 12 hours after submission.

Figure 3:
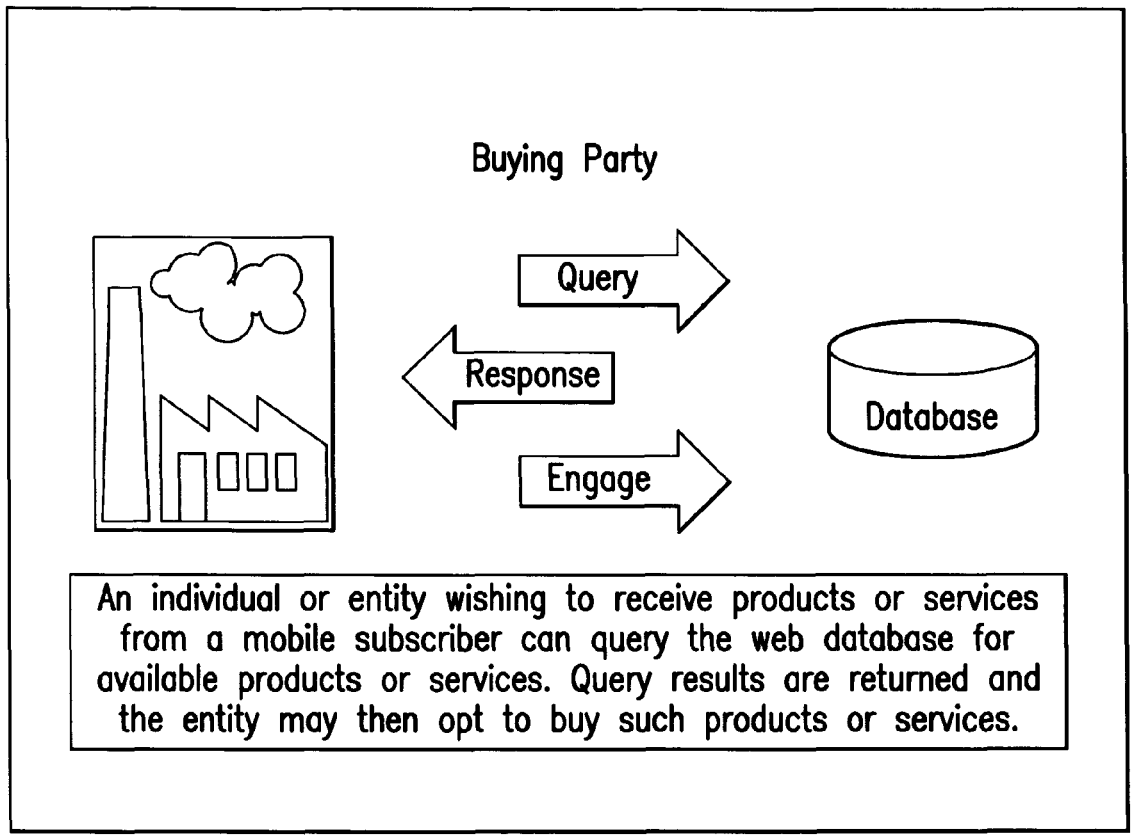
FIG. 3 is a diagram illustrating the interaction of an engaging entity with database 110 of the present invention.

As shown in FIG. 3, if an entity wants to procure the goods or services offered by a particular subscriber, that entity can query database 110 to identify a qualified subscriber whose profile matches their needs. For example, in accordance with the present invention the entity may go to a dedicated website to select the criteria they are seeking and submit a form to the database 110, using mostly pre-populated parameters. The resulting output will then contain the information of all those subscribers who have activated their availability and whose profiles directly or closely match those of the querying entity. That entity may then procure from the subscriber the desired goods or services.

Figure 4:
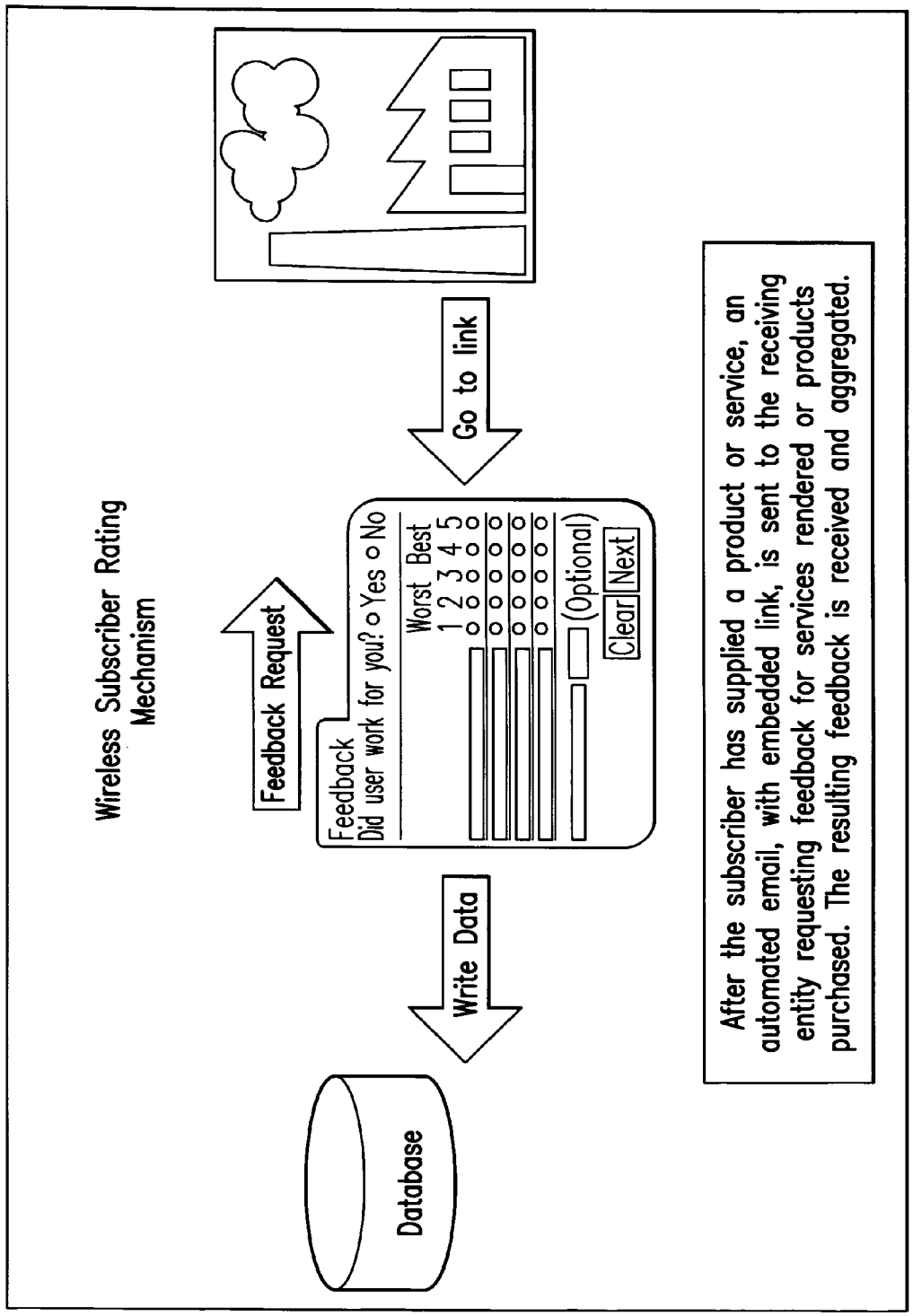
FIG. 4 is a diagram illustrating the further interaction of an engaging entity with database 110 of the present invention.

After the subscriber has been engaged, as described above, an automated mail, preferably with an embedded internet URL link, is sent to the engaging entity requesting feedback of the performance of the subscriber, that is, whether he provided the goods or performed the services in a satisfactory manner. See, for example, FIG. 4. More specifically, the engaging entity may be asked about various aspects of his engagement with the subscriber, such as, "Did the subscriber work for you?"; "Rate overall work quality"; "Rate attendance"; "Rate profile accuracy"; "Rate communications skills"; "Negotiated hourly wage (optional)". The feedback may be securely transmitted using secure socket layer (SSL) or other encryption to database 110. In a preferred embodiment, the feedback data is added (written) to the subscriber's profile in database 110 and is thus tied to the IMSI and/or MSISDN of the subscriber's mobile phone 100. Feedback from various engaging entities regarding the same subscriber may be aggregated to compile and provide a composite "score" for that subscriber. This score or rating may be displayed whenever a party seeking to engage a subscriber accesses that subscriber's profile.

Figure 5:
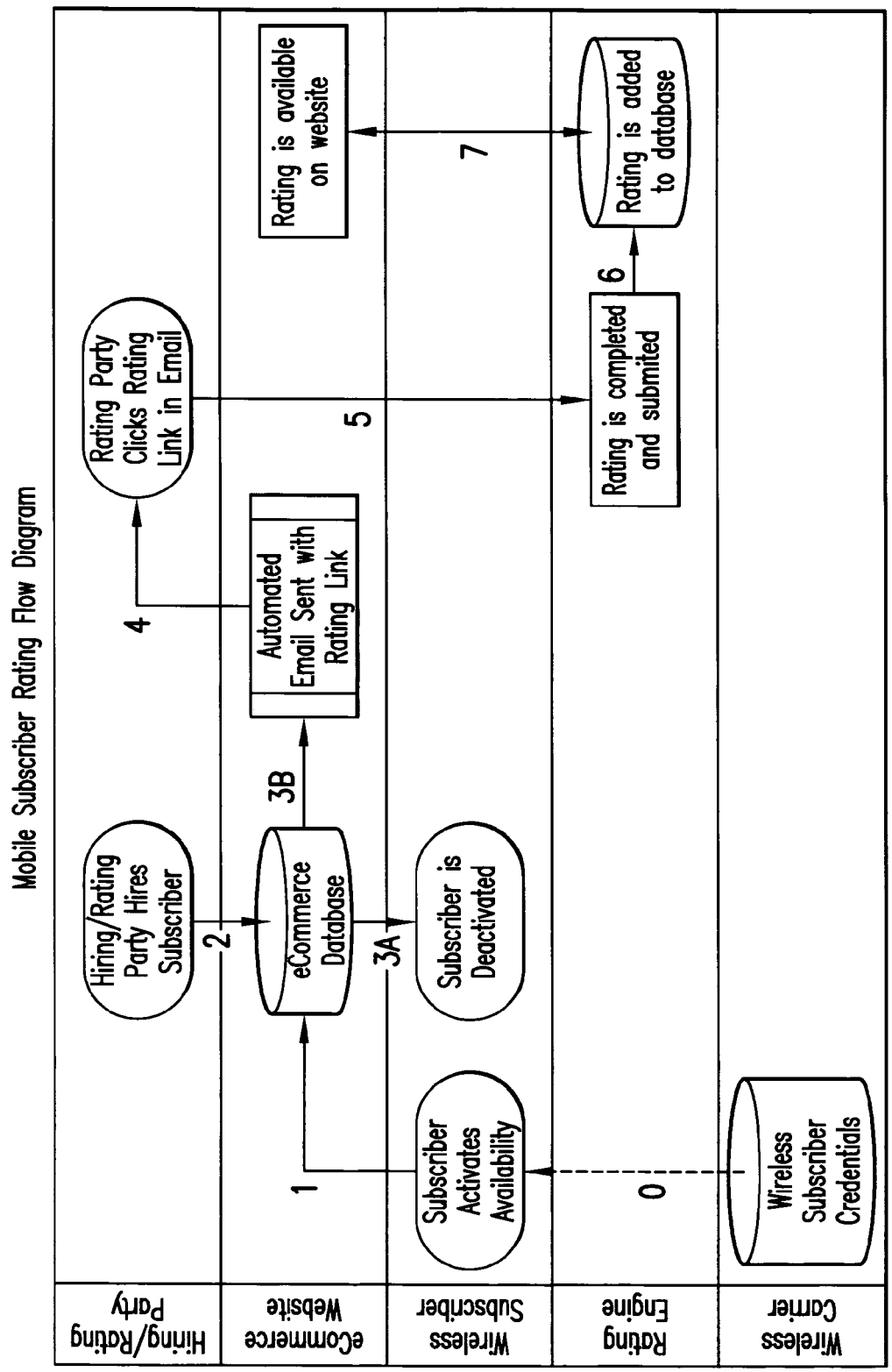
FIG. 5 is a diagram illustrating the flow of a mobile subscriber rating system and method of the present invention.

The above methods may be summarized with reference to FIG. 5, in which a method by which a subscriber may offer his services for hire is described. Of course, the present invention is not limited thereto, as will be understood by those skilled in the art. FIG. 5 is a diagram illustrating the flow of a mobile subscriber rating system and method of the present invention. As shown therein, Step 0 illustrates the relationship of the wireless subscriber to the wireless carrier. As the mobile subscriber is intended to have a level anonymity, his credentials are limited to one or more of the following: (i) International Mobile Subscriber Identity from the SIM card, (ii) Mobile Phone Number and/or (iii) mobile phone serial number. Step 1 illustrates the mobile subscriber making himself available for work using the "Activate" (or other) feature described above. When selecting this menu item, the SIM generates a special SMS (Text Message) or other message and sends it to the backend database 110. In a preferred embodiment, this it starts a timer. Step 2 shows a party (the engaging entity) hiring the wireless subscriber. As shown in Step 3A, when the subscriber has been hired, his availability is terminated in the database 110 so as not to allow for duplicative hiring. In Step 3B, after a predetermined amount of time has elapsed following the hiring of the wireless subscriber, an email, containing a link associated to the specific instance of the hiring of the subscriber, is generated by the database 110. In Step 4, the email generated in Step 3B is sent to the email address supplied by the hiring party in Step 2. In Step 5, upon receipt of the email, the hiring party, clicks on the dedicated link to the rating engine site where he will be prompted to answer a few questions, from which the rating will be derived. As shown in Step "6", when the rating has been submitted, it is added to the rating database 110 where it is aggregated to form the overall rating. The aggregated rating is now available to anyone visiting the website, provided that the wireless subscriber has availed himself (Step 7).

The foregoing, therefore, is considered as illustrative only of the principles of the embodiments of the invention. While the invention has been described above through a number of embodiments and implementations, the invention is not so limited, but rather covers various modifications and equivalent arrangements that may be apparent to one of skill in the respective art, all falling within the scope of the invention and within the scope of the appended claims.

What is claimed is:

1. A system for rating subscribers, comprising:
   a plurality of mobile phones, each of said mobile phones being associated with a subscriber and comprising at least one SIM card and each of said mobile phones being configured to communicate with a web-based database associated with the SIM card of said mobile phone and comprising a subscriber profile including subscriber attribute data and subscriber rating data;
   wherein said at least one SIM card in each of said plurality of mobile phones comprises unique attributes of said mobile phone;
   wherein when each of said plurality of mobile phones first communicates with said database, the subscriber profile associated with the SIM card of the mobile phone assocaited with that subscriber is created and stored in said database, said subscriber profile comprising at least one of said unique attributes of said mobile phone from said SIM card;
   wherein each of said subscribers and third parties may access said database and input data regarding a subscriber, said input data being received by said database and added to the subscriber profile; and
   wherein each subscriber is authorized to input it's associated subscriber attribute data and to only read subscriber rating data and each third party is authorized to input subscriber rating data associated with one or more subscriberss whom that third party has engaged and only to read subscriber attribute data.

2. A system according to claim 1, wherein said unique attributes of at least one of said plurality of mobile phones comprise said subscriber's Mobile Subscriber Integrated Services Digital Network information.

3. A system according to claim 1, wherein said unique attributes of at least one of said plurality of mobile phones comprise said subscriber's Mobile Dialing Number information.

4. A system according to claim 1, wherein said unique attributes of at least one of said plurality of mobile phones comprise said subscriber's International Mobile Subscriber Identity information.

5. A system according to claim 1, wherein said unique attributes of at least one of said plurality of mobile phones comprise said subscriber's Mobile Identification Number information.

6. A system according to claim 1, wherein said unique attributes of at least one of said plurality of mobile phones comprise said subscriber's Mobile Equipment Identification information.

7. A system according to claim 1, wherein said unique attributes of at least one of said plurality of mobile phones comprises said subscriber's Integrated Circuit Card Identification in GSM/UMTS/iDEN.

8. A method for rating subscribers, comprising:
communicating between a plurality of subscribers and a web-based database using a plurality of mobile phones, each of said mobile phones belonging to a subscriber and comprising at least one SIM card comprising unique attributes of said mobile phone, said web-based database being associated with the SIM card of said mobile phone and comprising a subscriber profile including subscriber attribute data and subscriber rating data;
creating the subscriber profile associated with the SIM card of the mobile phone associated with that subscriber when each of said plurality of mobile phones first communicates with said database, said subscriber profile comprising data unique to said subscriber and at least one of said unique attributes of said mobile phone from said SIM card; and
accessing said database by third parties, said third parties inputting data regarding a subscriber, said input data being received by said database and added to the subscriber profile associated with the mobile phone of said subscriber,
wherein each subscriber is authorized to input it's associated subscriber attribute data and to only read subscriber rating data and each third party is authorized to input subscriber rating data associated with one or more subscribers whom that third party has engaged and to only read subscriber attribute data.

9. A method according to claim 8, wherein said unique attributes of at least one of said plurality of mobile phones comprise said subscriber's Mobile Subscriber Integrated Services Digital Network information.

10. A method according to claim 8, wherein said unique attributes of at least one of said plurality of mobile phones comprise said subscriber's Mobile Dialing Number information.

11. A method according to claim 8, wherein said unique attributes of at least one of said plurality of mobile phones comprise said subscriber's International Mobile Subscriber Identity information.

12. A method according to claim 8, wherein said unique attributes of at least one of said plurality of mobile phones comprise said subscriber's Mobile Identification Number information.

13. A method according to claim 8, wherein said unique attributes of at least one of said plurality of mobile phones comprise said subscriber's Mobile Equipment Identification information.

14. A method according to claim 8, wherein said unique attributes of at least one of said plurality of mobile phones comprises said subscriber's Integrated Circuit Card Identification in GSM/UMTS/iDEN.

* * * * *